Feb. 9, 1932.   V. F. BOZEMAN   1,844,560
ROTARY HOE
Filed Feb. 13, 1928   2 Sheets-Sheet 2
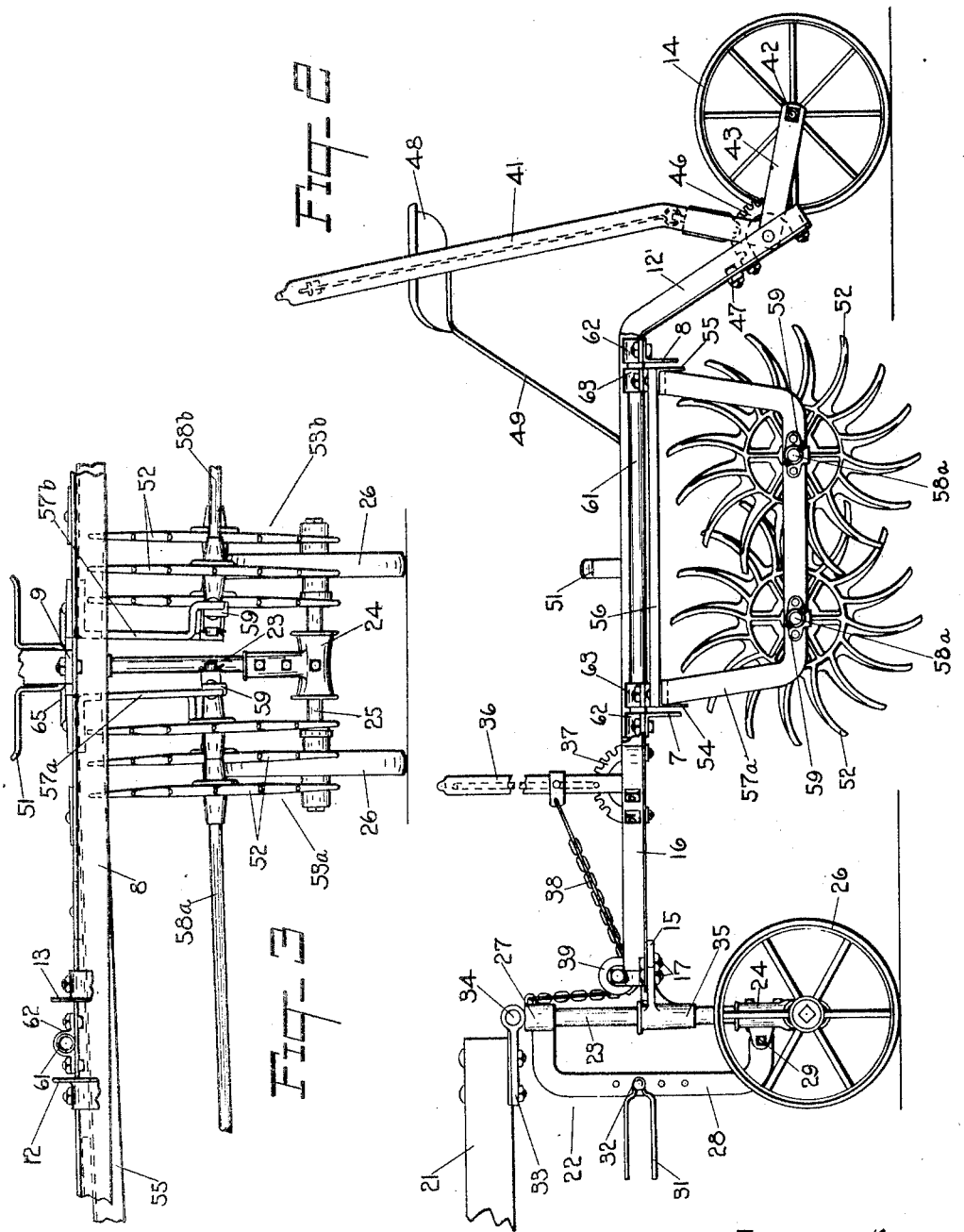
Inventor
Virgil F. Bozeman.
by Brown, Jackson, Boettcher & Dienner.
Attorneys
Witness
A.D. McLeay Feb. 9, 1932.  V. F. BOZEMAN  1,844,560
ROTARY HOE
Filed Feb. 13, 1928  2 Sheets-Sheet 1
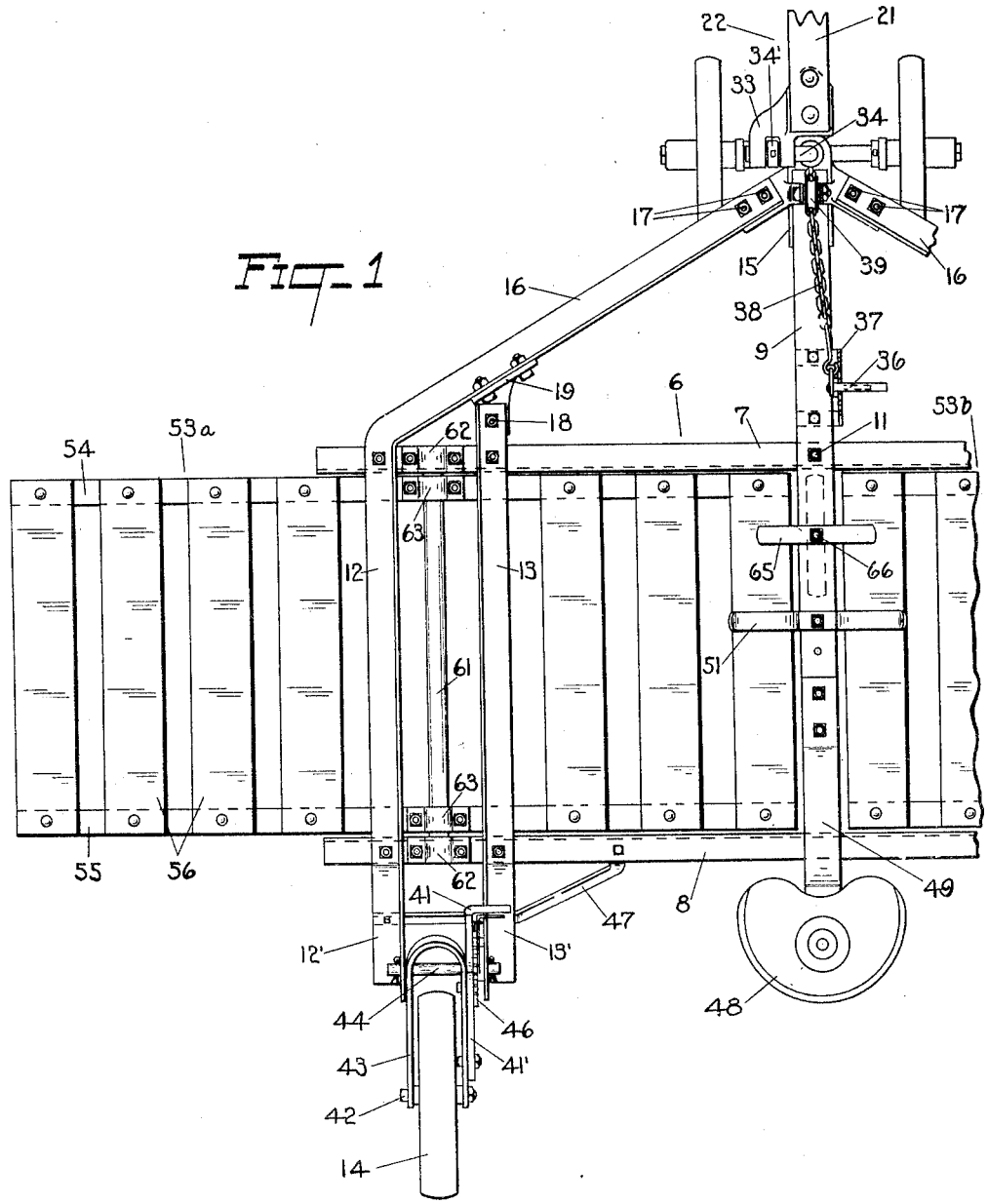
Fig_1
Witness
A.D. McLeay
Inventor
Virgil F. Bozeman,
by Brown, Jackson, Boettcher & Dienner
Attorneys Patented Feb. 9, 1932

1,844,560

UNITED STATES PATENT OFFICE

VIRGIL F. BOZEMAN, OF MOLINE, ILLINOIS, ASSIGNOR TO DEERE & COMPANY, OF MOLINE, ILLINOIS, A CORPORATION OF ILLINOIS

ROTARY HOE

Application filed February 13, 1928. Serial No. 253,835.

The present invention relates to that type of cultivating implement commonly referred to as a rotary hoe, such implements being usually characterized by two transversely extending shafts on which closely spaced rotating hoe wheels are mounted, the latter having long, radially extending teeth adapted to enter the soil in the forward rolling motion of the hoe wheels over the ground. Such implements are frequently used in the cultivation of corn and like plants, having particular utility for breaking up crusty soil in the first or second cultivating operations.

The invention is concerned with the construction of a rotary hoe of relatively wide span, for cultivating three or more corn rows, and has for one of its principal objects to provide an implement of this type which is characterized by a transverse flexibility, i. e., wherein different groups of the hoe wheels can rise and fall independently of each other in traveling over uneven ground. This flexibility is of decided advantage in implements of wide span owing to the greater likelihood of the different wheels of such an implement encountering uneven ground. However, it is within the purview of my invention to incorporate such feature in implements of narrower span.

Another object of the invention is to so construct the implement that all of the hoe wheels can be lifted off the ground to transport position, notwithstanding the lateral flexibility between the hoe wheels.

Another object of the invention is to provide an improved construction and arrangement of adjustable supporting wheels which serve to govern the depth of penetration of the hoe wheels, and which also serve to support all of the hoe wheels in their transport position, clear of the ground, when the implement is to be transported to or from the field.

Other objects and advantages of the invention will appear in the following description of a preferred embodiment thereof. In the accompanying drawings illustrating such embodiment:

Fig. 1 is a fragmentary plan view illustrating the left hand side of the implement.

Fig. 2 is a side elevational view of the implement, with the hoe wheels lowered to ground engaging position; and Fig. 3 is a fragmentary rear elevational view of the central portion of the implement, illustrating the hoe wheels raised to transport position.

The main frame 6 of the implement comprises transversely extending front and rear angle bars 7 and 8 which are secured together at the center of the implement by a longitudinal frame bar 9, the latter being bolted or otherwise secured to the horizontal flanges of the transverse frame bars 7—8, as indicated at 11 in Fig. 1. The end portions of the transverse bars 7—8 are joined together at the sides of the frame by laterally spaced pairs of angle bars 12 and 13 which are also bolted or otherwise secured to the horizontal flanges of the angle bars 7—8. Fig. 1 only illustrates the lateral frame bars 12—13 at the left hand side of the implement, but it will be understood that this arrangement of lateral frame bars is also duplicated at the right hand side of the frame. The rear ends of the lateral frame bars are bent downwardly to form the two side portions 12' and 13' of a yoke-shaped frame structure in which each rear supporting wheel 14 has adjustable mounting, as I shall hereinafter describe.

The central frame bar 9 extends forwardly from the transverse frame bar 7 and has a bracket 15 secured to its front end. The front portion of the outermost lateral frame bar 12 is bent inwardly toward the center of the implement, as indicated at 16, the front end of this diagonal portion being bolted to an arm extension of the bracket 15, as indicated at 17. The front end of the inner lateral frame bar 13 is bolted or otherwise secured at 18 to a bracket 19 which is secured to the inner side of the diagonal frame bar 16. It will be noted that the diagonal frame bar portions 16 on each side of the implement reenforce the main frame against lateral or twisting distortion.

If desired, the central frame bar 9 may be connected directly to the draft tongue 21, but I find it preferable to interpose a tongue truck 22 between the front end of the implement and the draft tongue 21 so as to avoid the downwardly tipping weight of the front end of the implement being transmitted to the neck yoke of the team. Referring to Figs. 2 and 3, such tongue truck preferably comprises a vertical standard 23, the lower end of which is secured in an inverted T-shaped bracket 24. Extending horizontally through this bracket is an axle 25 on the outer ends of which the two truck wheels 26 are journaled. A collar 27 is fixedly secured to the upper end of the standard 23, and extending downwardly from this collar is a C-shaped bar 28 which has its lower end secured to the bracket 24, as indicated at 29. Draft is transmitted to the implement through a draft clevis 31 which is coupled at 32 to the bar 28, the latter being provided with a plurality of vertically spaced holes for receiving the coupling pin 32 in order that the point of draft hitch may be raised or lowered relative to the implement. The draft tongue 21 has a bracket 33 secured to its rear end, which bracket is pivotally connected at 34 to the upper end of the standard 23. Referring to Fig. 1, it will be seen that the pivot 34 is formed by bending the upper end of the standard 23 laterally. The bracket 33 is forked to provide laterally spaced hub portions engaging over the pivot arm 34, the hub portions being held on the pivot arm by a collar 34' which is secured to the pivot arm between the hubs. The bracket 15 at the forward end of the implement frame is provided with a vertical sleeve 35 which has rotatable and slidable support on the standard 23. The front end of the implement frame is caused to move upwardly or downwardly along the standard 23 through the actuation of an adjusting lever 36 which is pivotally mounted on the central frame bar and which is adapted to have latched engagement with a sector 37 also secured to the frame bar. Any suitable mechanism may be employed to connect this lever with the implement frame and with the upper end of the tongue truck, but in the construction shown I employ a chain 38 which is connected at one end to the lever and at the other end to a hook or lug projecting from the rear of the collar 27. The intermediate portion of the chain passes under a pulley 39 which has pivotal support between arms extending upwardly from the bracket 15, and it will be evident that by moving the lever 36 forwardly or rearwardly the front end of the implement frame will be caused to move downwardly or upwardly along the standard 23.

The rear portion of the implement frame 6 is raised and lowered and leveled by actuation of adjusting levers 41, one of which is associated with each rear supporting wheel 14. Referring to Fig. 1, each wheel 14 is mounted upon a pivot pin or axle 42 which extends through the lower separated ends of a U-shaped arm or yoke 43, the side portions of which afford bearing support for the wheel on each side thereof. The looped or closed end of the yoke-shaped member 43 has pivotal mounting between the rear ends 12' and 13' of the lateral frame bars, on a pivot pin 44 which passes through alined holes in the side portions of the yoke member 43 and in the upwardly extending flanges of the frame members 12' and 13'. The lower end of the adjusting lever 41 has a rearwardly bent arm 41' which is bolted or otherwise secured to one of the side arm portions of the yoke member 43, whereby forward or backward movement of the adjusting lever will result in the yoke member 43 and wheel 14 swinging upwardly or downwardly with respect to the implement frame. The adjusting lever 41 carries any suitable form of latching dog adapted to engage with a latching sector 46 which is secured to the adjacent frame member 13'. A transversely extending brace bar 47 may be secured to the intermediate portions of the downwardly inclined frame bar extensions 12' and 13', with the inner end of such brace bar inclined forwardly and upwardly for fastening to the under side of the rear frame bar 8. It will be understood that the rear supporting wheel 14 at the right hand side of the implement frame is mounted in substantially the same manner as illustrated in Fig. 1, and is also adjustable for raising and lowering the right hand side of the implement frame through the instrumentality of an individual adjusting lever 41. The operator's seat 48 is mounted on a seat spring 49 which is secured to the central frame bar 9. From his position on this seat, the operator can actuate all three adjusting levers 36, 41, 41 for controlling the depth of penetration of the hoe wheels or for raising or lowering the hoe wheels between transport and operative positions. 51 designates a foot rest which is suitably secured to the central frame bar 9.

The rotary hoes consist of wheels 52 having long pointed teeth adapted to penetrate the soil with a rolling motion in the forward travel of the implement. The hoe wheels are arranged in front and rear rows or series, with the wheels of one series disposed in staggered or offset relation with respect to the wheels of the other series, as best shown in Fig. 3, it being also noted that the two series of wheels overlap each other transversely of the implement. All of the hoe wheels at the left hand side of the implement are carried on movable supporting means in the nature of a sub-frame 53a, and all of the hoe wheels at the right hand side of the implement are similarly carried on like supporting means in the nature of a sub-frame 53b. A description of the sub-frame 53a and of the mounting of the hoe wheels thereon will suffice for the other sub-frame 53b, as the construction is duplicated at both sides of the implement. Each sub-frame comprises transversely extending front and rear angle bars 54 and 55 which are cross-connected at spaced points by boards 56 which have their ends bolted or otherwise secured to the horizontal flanges of the angle bars 54—55. Rigidly secured to and depending from the opposite ends of the bars 54—55 are U-shaped bars 57a or 57b, see Figs. 2 and 3. These side bars support front and rear shafts 58a or 58b, each pair of front and rear shafts being individual to its respective sub-frame. The opposite ends of the shafts extend through holes in the depending bars 57a—57b and have bearing support in bearing brackets 59 which are secured to these depending bars. The front and rear series of hoe wheels are mounted on these front and rear shafts, each hoe wheel being rotatable on its shaft independently of the adjacent hoe wheels. As will be observed from Fig. 3, each hoe wheel is provided with a hub which extends in both directions from the plane of the wheel, the hubs of adjacent wheels contacting end to end and serving to space the wheels.

Each sub-frame is pivotally supported on the main frame for transverse rocking movement about a longitudinally extending pivot shaft 61 which is mounted on the outer end of the main frame, preferably between the lateral frame bars 12 and 13. The front and rear ends of the shaft 61 are carried in brackets 62 which are secured to the front and rear bars 7 and 8 of the main frame. The front and rear bars 54—55 of the sub-frame have pivot brackets 63 secured thereto, which pivot brackets have pivotal mounting on the shaft 61. The mounting of the other gang or section 53b at the right hand side of the implement is substantially the same as described and illustrated in Fig. 1. It will thus be seen that a flexible relation is established between the hoe wheels at opposite sides of the implement, whereby the inner and outer ends of each gang or section of wheels can rise or fall independently of the other gang in passing over uneven ground. The three-point wheel support of the main frame also adapts the implement to uneven ground conditions, and insures that equal portions of the weight of the frame will be applied to both gangs. The forwardly extending boards 56 afford platform surfaces upon which weights can be placed for forcing the teeth of the hoe wheels into hard or crusty soil. It should be noted that in the construction described above the rear carrying wheels 14 are positioned substantially in longitudinal alinement with the pivots 61 about which the hoe sections rock vertically, and by reason of this positioning of said wheels the vertical position of the substantial fore and aft center of each of the hoe sections is gauged from a point as close as possible to the ground directly underneath, which gives more accurate gauging of the hoe wheels than if the rear carrying wheels were positioned further to the right or left as in that case the vertical position of the substantial fore and aft center of each hoe section would be gauged from a point on the ground further removed from the ground directly underneath.

When the implement frame is raised to transport position, through actuation of the adjusting levers 36, 41—41, it is desirable that the two sub-frames be held against rocking movement so as to prevent any of the hoe wheels from swinging downwardly and striking the road or obstructions on the ground. Such is accomplished by providing means which will hold each sub-frame substantially in parallel relation to the main frame, or which will limit the rocking movement of the sub-frames relative to the main frame. If desired, the pivot axes 61 may be located equidistantly from the ends of their respective sub-frames, so that each sub-frame will be supported substantially in equilibrium, in which event the holding means will be of such nature as to prevent rocking movement of the sub-frame in either direction. I find it preferable, however, to pivotally support each sub-frame in an unbalanced relation with one end heavier than the other, and to provide holding means which merely serves to prevent the heavy end of the sub-frame from rocking downwardly into engagement with the ground when the main frame is lifted to transport position. Either end of the sub-frame may be arranged to have the preponderating weight, by properly locating the pivot axis 61 with reference to the ends of the sub-frame, but in the construction shown I have illustrated this pivot axis as being disposed closer to the inner end of the sub-frame so that the outer end thereof will have the preponderating weight. With such arrangement, I provide a bar 65 which is pivotally mounted intermediate its ends at 66 on the central frame bar 9. Said bar 65 can be turned to a transverse position, as illustrated in full lines in Fig. 1, in which position its two arms extend over the ends of the two sub-frames for limiting the upward swinging movement of these ends of the sub-frames. By turning the bar 65 substantially into parallelism with the frame bar 9, as indicated in dotted lines in Fig. 1, the inner ends of the sub-frames are free to rise and fall through a considerable angle in permitting the hoe wheels to adapt themselves to uneven ground conditions. In this regard, attention is directed to the fact that the pivot brackets 63 are constructed to dispose the upper sides of the sub-frame bars 54—55 a sufficient distance below the lateral frame bars 12—13 to permit the desired degree of rocking movement of each sub-frame. Fig. 3 illustrates the hoe wheels raised to their transport position, from which it will be seen that the transverse position of the stop bar 65 limits the upward tilting of the inner ends of the sub-frames so that the latter are maintained approximately in parallelism with the main frame 6. It will also be seen from Fig. 3 that the stagger of the front and rear series of hoe wheels is oppositely arranged in each lateral gang or section, i. e., the innermost wheel of the left-hand gang is mounted on the rear shaft 58a. while the innermost wheel of the right hand gang is mounted on the front shaft 58b. This permits the stagger of the front and rear bearings 59 of one gang to correspond with the stagger of the same bearings of the opposite gang, whereby the inner ends of the two gangs may be brought closer together without causing interference between the gangs in their relative rocking movement. While the drawings only illustrate the U-shaped frame bars 57a, 57b at the extremities of the sub-frames, it will be understood that one or more of these frame bars may be mounted on each sub-frame intermediate its ends for supporting the intermediate portions of the shafts 58a, 58b.

While I have illustrated and described what I consider to be the preferred embodiment of my invention, it will be understood that such is merely exemplary and that numerous modifications and rearrangments may be made therein without departing from the essence of the invention.

I claim:

1. A rotary hoe implement comprising a frame, a plurality of hoe wheels carried by said frame and supported for vertical movement about an axis extending substantially fore and aft of said frame, and between the ends thereof, and latch means on said frame for holding said hoe wheels against vertical movement in one direction relative to said frame.

2. A rotary hoe implement comprising a main frame, supporting means for said main frame positioned intermediate the ends of said sub-frame, a plurality of sub-frames pivotally mounted for transverse rocking movement on said main frame, hoe wheels carried by said sub-frames, means for raising and lowering said main frame relative to said supporting means, and means for holding said sub-frames in definite relation to said main frame against movement in one direction when said hoe wheels are raised to transport position.

3. In a rotary hoe implement, the combination of a frame, a plurality of hoe wheels rockably carried by said frame, and adjustable wheel supports for the rear portion of said frame disposed in rear of the series of hoe wheels and spaced inwardly from the outer ends of the series of wheels.

4. In a rotary hoe implement, the combination of a main frame, a tongue truck supporting the front portion of said frame, means for raising and lowering said frame relative to said tongue truck, a pair of laterally spaced wheels supporting the rear portion of said frame, means for raising and lowering said frame relative to said laterally spaced wheels, sub-frames pivotally mounted on said main frame, and hoe wheels carried by said sub-frames and extending outwardly beyond the fore and aft planes of said laterally spaced wheels.

5. In a rotary hoe implement, the combination of a frame comprising transverse frame bars, lateral frame bars adjacent the outer ends of and extending rearwardly beyond said transverse frame bars, adjustable wheel supports on which the rearwardly extending ends of said lateral frame bars are mounted, the front ends of said lateral frame bars being extended forwardly and inwardly toward the longitudinal median plane of the implement, a tongue truck supporting the forward ends of said lateral frame bars, and a plurality of hoe wheels disposed transversely of the implement and supported by said frame.

6. In a rotary hoe implement, the combination of a main frame, a wheel support for the front portion of said frame, sub-frames pivotally mounted on said main frame for transverse rocking movement, hoe wheels carried by said sub-frames, laterally spaced wheel supports for the rear portion of said frame positioned intermediate the ends of said sub-frames, means for raising said hoe wheels to transport position, and means for holding said sub-frames in substantially definite relation to said main frame against movement in one direction when the hoe wheels are thus raised.

7. A rotary hoe implement comprising a main frame, front and rear wheel supports for said main frame, means for raising and lowering said frame relative to said wheel supports, a pair of sub-frames each pivotally connected intermediate its ends to said main frame, hoe wheels carried by each of said sub-frames, each of said sub-frames having one end of preponderating weight tending to swing downwardly when said main frame is raised to transport position, and means carried by said main frame for holding the latter ends of said sub-frames against swinging downwardly when said main frame is thus raised.

8. In a rotary hoe implement, the combination of a frame comprising transversely extending frame bars, a pair of lateral frame bars at each side of said frame and extending rearwardly from said transverse bars, U-shaped members pivotally supported between each pair of lateral frame bars, a supporting wheel pivotally mounted between the side portions of each of said U-shaped members, adjusting levers connected to said U-shaped members for swinging the latter relative to said lateral frame bars and thereby raising or lowering said frame, longitudinally extending frame bars carried by said transverse bars, front and rear shafts carried by said longitudinally extending frame bars, and hoe wheels mounted on said shafts.

9. A rotary hoe implement comprising a main frame, supporting wheels therefor, a plurality of sub-frames flexibly connected together, hoe wheels carried by said sub-frames, means for raising and lowering said sub-frames relatively to said supporting wheels, and rotating means operable to secure said sub-frames against relative movement in one direction when they are in raised position.

10. A rotary hoe implement comprising a main frame, a plurality of sub-frames flexibly connected together, hoe wheels carried by said sub-frames, and operable means mounted on said main frame to secure said sub-frames against relative movement in one direction.

11. A rotary hoe implement comprising a main frame, sub-frames carried by said main frame, a plurality of hoe wheels carried by each of said sub-frames for vertical movement about an axis extending substantially fore and aft of said frames, and optionally operable means mounted on the main frame for holding said hoe wheels against vertical movement relative to said main frame in one direction.

12. A rotary hoe implement comprising a plurality of frames flexibly connected together for rocking movement about transversely spaced axes, hoe wheels carried by said frames, and means adapted to contact with the inner ends of said sub-frames and operable to secure said frames against relative movement in one direction.

13. A rotary hoe implement comprising a plurality of frames flexibly connected together at transversely spaced points, hoe wheels carried by said frames, and means located intermediate said transversely spaced points optionally operable to secure said frames against relative movement in one direction.

14. A rotary hoe implement comprising a main frame, laterally spaced pivot shafts mounted on said main frame, a sub-frame pivotally mounted on each of said shafts, hoe wheels carried by said sub-frames, and laterally spaced supporting wheels for the rear portion of said main frame, said supporting wheels being positioned substantially in longitudinal alinement with said pivot shafts.

15. A rotary hoe implement comprisng a main frame, a wheel support for the front portion of said frame, laterally spaced pivot shafts mounted on said main frame, a sub-frame pivotally mounted on each of said shafts to rock thereabout, hoe wheels carried by said sub-frames, laterally spaced supporting wheels for the rear portion of said main frame, said supporting wheels being positioned substantially in longitudinal alinement with respect to said pivot shafts, and optionally operable means for preventing rocking of said sub-frames on said pivot shafts in one direction.

16. A rotary hoe implement comprising a main frame, a wheel support for the front portion of said frame, laterally spaced pivot shafts mounted on said main frame, a sub-frame pivotally mounted on each of said shafts to rock thereabout, hoe wheels carried by said sub-frames, and wheel supports for the rear portion of said main frame disposed in rear of said sub-frames and spaced inwardly from the outer ends of and substantially in longitudinal alinement with the pivot axes of said sub-frames.

17. A rotary hoe implement comprising a main frame, supporting wheels therefor, a single sub-frame pivotally mounted on each side of said frame adjacent the outer end thereof and extending from the substantial fore and aft median plane of the implement beyond the outer extremity thereof, shafts extending entirely across said sub-frames, and hoe wheels rotatably mounted on said shafts.

18. A rotary hoe implement comprising a main frame, and a plurality of sub-frames each comprising transverse bars extending from the longitudinal medium line of the harrow beyond the outer end portion thereof and pivotally connected with said main frame, end bars connecting said transverse bars, rigid hoe wheel shafts extending from one end bar to the other and secured thereto.

19. In a rotary hoe implement the combination of a main frame, supporting means for said frame, a plurality of sub-frames positioned in the horizontal plane of the main frame and pivotally connected therewith, and a plurality of hoe wheels carried by each of said sub-frames.

20. In a rotary hoe implement, the combination of a main frame, supporting means for said frame, a plurality of sub-frames positioned in the horizontal plane of the main frame and pivotally connected therewith, a plurality of hoe wheels carried by each of said sub-frames, and latch means on the main frame cooperating with said sub-frames for holding them against movement in one direction.

21. A rotary hoe implement comprising a main frame, a plurality of sub-frames pivotally mounted for transverse rocking movement on said main frame and hoe wheels pivotally mounted in sub-frames, the pivotal axis of said sub-frames lying above the pivotal axis of said hoe wheels.

22. In a rotary hoe implement, the combination of a main frame, a plurality of sub-frames pivotally connected with said main frame, and a plurality of hoe wheels carried by each of said sub-frames, the pivot connections of said sub-frames lying substantially in the horizontal plane of the main frame.

In witness whereof I hereunto subscribe my name this 6th day of February, 1928.

VIRGIL F. BOZEMAN.

CERTIFICATE OF CORRECTION.

Patent No. 1,844,560.             Granted February 9, 1932, to

VIRGIL F. BOZEMAN.

It is hereby certified that error appears in the printed specification of the above numbered patent requiring correction as follows: Page 4, lines 47 to 49, claim 2, strike out the words "supporting means for said main frame positioned intermediate the ends of said sub-frame" and insert before "means" in line 52, same claim, supporting means for said main frame positioned intermediate the ends of said sub-frames; and that the said Letters Patent should be read with these corrections therein that the same may conform to the record of the case in the Patent Office.

Signed and sealed this 29th day of March, A. D. 1932.

(Seal)
                                             M. J. Moore,
                                     Acting Commissioner of Patents.